Oct. 19, 1943.    R. H. BAUKIND    2,332,363
CLAMP
Filed Feb. 25, 1941
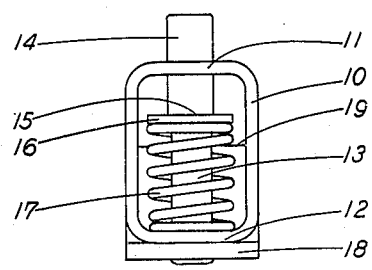
FIG-I
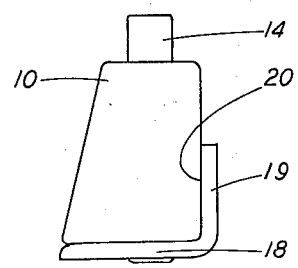
FIG-II
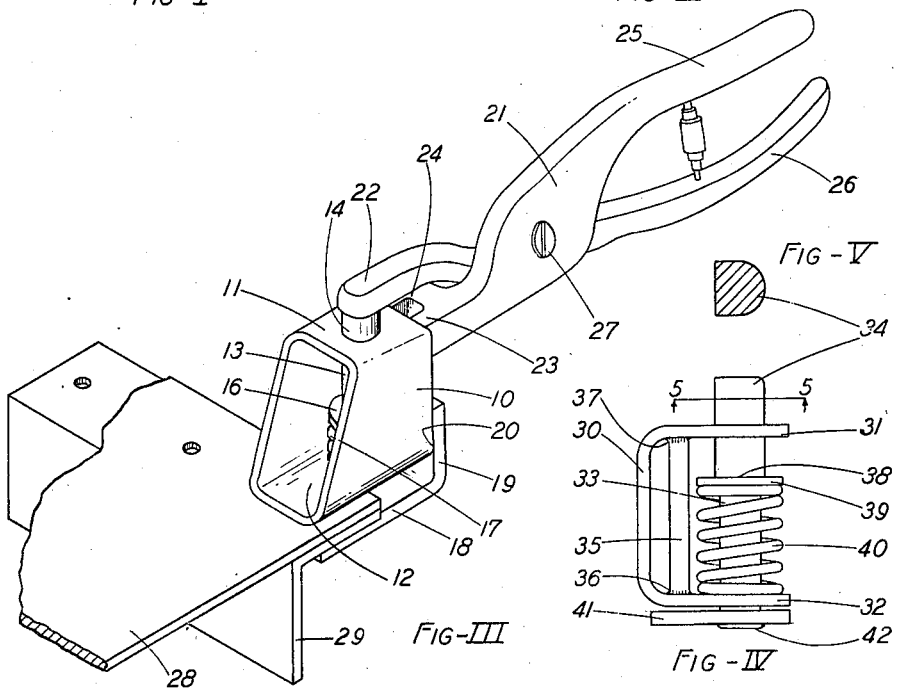
FIG-III
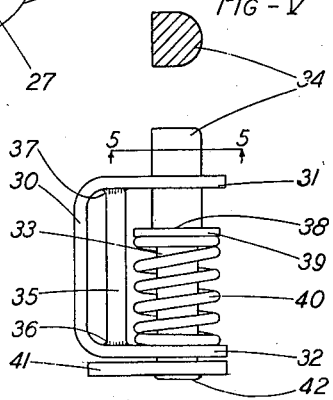
FIG-IV
FIG-V
INVENTOR
Robert H. Baukind Patented Oct. 19, 1943

2,332,363

UNITED STATES PATENT OFFICE 2,332,363

CLAMP

Robert H. Baukind, Burbank, Calif., assignor to Lockheed Aircraft Corporation, Burbank, Calif.

Application February 25, 1941, Serial No. 380,521

6 Claims. (Cl. 24—263)

This invention relates to clamping devices, in general and particularly to quick acting clamps adapted to application to sheet metal working and fabrication operations.

In the fabricating of sheet metal assemblies such as employed in the airplane manufacturing industry where two or more sheet metal, or the like metal, parts must be accurately fitted together and firmly held in position while certain necessary operations are performed such as cutting, drilling, reaming and riveting, some suitable quick acting temporary means is required to hold the parts in their proper relative positions. Heretofore it has been common practice to position the various parts of an assembly by means of locating pins thrust through specially placed locating holes or to employ screw operated "C clamps" or the like devices, all of which were slow and some of which required special drilling or forming operations.

The present invention has for its object to provide a clamping means readily adaptable to use on sheet metal assemblies composed of flat stock, angles or the like shapes, and which will eliminate the necessity of special drilling or forming operations and which will be simple and rapid in operation. It is also an object to provide a fastening device which will be compact and thus afford a minimum of interference with the tools by means of which the fabrication of an assembly is performed.

Other objects and features of the invention will be evident hereinafter.

This invention will be described by reference to the accompanying drawing of a preferred embodiment thereof in which—

Figure I is an end elevation of the clamp mechanism;

Figure II is a side elevation in partial section;

Figure III is an isometric view of the clamp operating mechanism together with the clamp as applied to certain work parts to be assembled, as a typical example;

Figure IV is a side elevation of an optional construction of the clamp mechanism; and Figure V is a cross-sectional view taken at V—V of Figure IV.

Referring primarily to Figures I to III of the drawings, 10 is a guide or frame of rectangular tubular cross-section form carrying an upper cross-member 11 and a lower cross-member 12 of greater area than said upper member. Surfaces 11 and 12 are provided with drilled guide holes through which a plunger 13 is retained and adapted to be longitudinally movable. The plunger 13 carries an upper pin extension 14 of enlarged diameter with respect to the lower portion of the plunger and at the junction of the two portions of different diameter a shoulder 15 is formed. A thrust washer 16 bears upward upon the shoulder 15, and a coil spring 17 is retained under compression between said washer 16 and the inside surface of the lower cross-member 12 of the frame.

The lower end of the plunger 13 which extends through the clamping surface 12 carries a movable clamping element 18 which normally rests under pressure against the lower surface of the cross-member 12 by reason of the compressive force of the spring 17.

The clamping element 18 carries at one edge thereof an upturned guide surface 19 which is adapted to bear against and make sliding contact with the end surfaces of the rectangular frame 10 as shown at 20, for the purpose of maintaining the two adjacent clamping surfaces 12 and 18 in proper angular alignment relative to one another during movement.

Referring particularly to Figure III, 21 is a special pliers employed for operating the clamp in applying or removing it from the work parts to be assembled. The pliers 21 carries a nose 22 adapted to contact the upper end of the pin extension 14 of the plunger 13 and an oppositely disposed fork member carrying a pair of parallel prongs 23 and 24 adapted to fit into the rectangular frame 10 and bear upon the lower side of the upper cross-member 11 at either side of the plunger pin 14. The said nose 22 and parallel prongs are adapted to open and close by pivoting about a common center 27 and to be actuated by lever handles 25 and 26 which are arranged to be grasped in the hand of the operator of the clamping mechanism.

A metal sheet 28 and a metal angle 29 are shown by way of illustration held together in the clamp in position for riveting operations.

In operation the pliers is applied to the clamp as illustrated in Figure III and force applied by grasping the pliers handles 25 and 26. Compressive force is thus applied between the under surface of the upper cross-member of the frame 10 and the top end of the plunger pin 14 to compress the spring 17 and thereby to open the clamping elements 12 and 18, whereby parts such as sheet 28 and angle 29 may be inserted therebetween or removed. Upon releasing the force of the pliers the clamping members 12 and 18 are allowed to close upon the work as shown in Figure III under the pressure of the compressed coil spring 17.

After placing the clamping mechanism in position on a piece of work the pliers may be removed leaving only the relatively small clamping mechanism in place. Interference to the working operations is thus reduced to a minimum.

Figure IV illustrates an optional construction of the clamp mechanism in which 30 is a C shaped guide or frame as viewed in side elevation, carrying an upper horizontal guide member 31 and a lower guide and clamping member 32. A column 35 welded or otherwise suitably attached at 36 and 37 to the elements 31 and 32 serves to impart stiffness to the frame to maintain its shape under operating stresses. Said upper and lower members 31 and 32 are provided with guide holes through which the plunger 33 extends and is adapted to be longitudinally movable as in the case of the apparatus of Figure I. The plunger 33 carries an upper pin extension 34 of half round cross-section as shown in sectional view in Figure V. The guide hole opening provided for the said pin in the upper guide member 31 is shaped to fit the pin snugly and thus secure it against rotational movement. The lower portion of the plunger 33 is of circular cross-section and of reduced diameter with respect to the said half round upper pin extension 34 thereby forming a shoulder 38 at the junction point. A thrust washer 39 bears upward upon the shoulder 38, and a coil spring 40 is retained under compression between said thrust washer 39 and the inside surface of the lower frame guide member 32.

The lower end of the plunger 33 which extends through the lower frame member 32 carries a clamping element 41 welded, riveted or otherwise suitably attached at 42. The clamping element 41 while shown slightly separated from its adjacent frame member 32, for purposes of clearer illustration normally rests under pressure against the lower surface thereof by reason of the compressive force of the coil spring 40 acting upwardly through the plunger 33.

The operation of the apparatus of Figure IV is similar to that hereinbefore described in connection with that of Figures I and II. Pliers such as shown at 21 may be applied to the clamp by inserting the lower prongs 23 and 24 into the C frame so that they bear against the lower surface of the frame member 31 on either side of the pin 34. The upper nose 22 of the pliers will then be in a position to apply compressive force to the upper end of the pin 34 to compress the spring 40 and thereby to open the space between the clamping member 41 and the element 32 of the frame whereby work to be clamped may be inserted or removed.

Advantages of the apparatus of this invention reside in the rapidity and facility with which it can be applied to various metal parts to be assembled, the elimination of the necessity for drilling special locating holes through which such parts have heretofore been largely clamped in proper relative positions, and its compactness and freedom from obstruction and interference with work being performed upon the assemblies. The apparatus of this invention has many applications but it finds its chief and most valuable application in aircraft factories in the accurate and rapid manufacture and fabrication of sheet metal airplane parts.

The description herein is not to be limiting but is merely illustrative of a preferred embodiment and other apparatus is possible within the scope of the claims.

I claim:
1. A clamp comprising in combination a rectangular guide frame carrying a plane clamping surface, a plunger passing through said frame, a second plane clamping surface carried on one end of said plunger and positioned adjacent said first mentioned clamping surface carried by said frame, a spring in said guide frame surrounding said plunger and extending between said frame and an abutment carried by said plunger adapted normally by applying force between said frame and said abutment to force said clamping surfaces together and means carried by said plunger and movably associated with said frame to compress said spring and force said clamping surfaces apart whereby they may be placed over objects to be clamped.

2. Apparatus according to claim 1 in which the means to compress said spring and force said clamping surfaces apart comprises a pin extension from said plunger through the guide frame at a point opposite the clamping surface thereon.

3. A clamp comprising in combination a rectangular guide frame carrying a clamping surface, a plunger passing through said frame, a second clamping surface carried on one end of said plunger and normally positioned adjacent said first mentioned clamping surface, a guide member associated with said second clamping surface to maintain said second surface in alignment with said first mentioned clamping surface carried by said guide frame, a spring in said guide frame surrounding said plunger and extending between said frame and an abutment carried by said plunger adapted normally by applying force between said frame and said abutment to force said clamping surfaces together, and a pin extension from said plunger through the guide frame at a point opposite the clamping surface thereon, whereby pressure may be applied to said pin to compress said spring and force said clamping surfaces apart, whereby they may be placed over objects to be clamped.

4. A clamp comprising in combination a guide having parallel upper and lower members and interconnecting side member forming a closed guide frame, said lower member carrying a plane clamping surface, a plunger passing through the said lower member of said frame, a second plane clamping surface carried on one end of said plunger and positioned adjacent said first mentioned clamping surface carried by said frame, a spring in said guide frame surrounding said plunger and extending between said lower member and an abutment carried by said plunger adapted normally by applying force between said lower member and said abutment to force said clamping surfaces together and means carried by said plunger and movably associated with said frame to compress said spring and force said clamping surfaces apart whereby they may be placed over objects to be clamped.

5. A clamp comprising in combination a guide having parallel upper and lower members and interconnecting side members forming a closed guide frame, said lower member carrying a plane clamping surface, a plunger passing through said lower member of said frame, a second clamping surface carried on one end of said plunger and normally positioned adjacent said first mentioned clamping surface, a guide member associated with said second clamping surface to maintain said second surface in alignment with said first mentioned clamping surface carried by said guide frame, a spring in said guide frame surrounding said plunger and extending between said lower member and an abutment carried by said plunger adapted normally by applying force between said lower member and said abutment to force said clamping surfaces together, and a pin extension from said plunger passing through the guide frame at a point opposite the clamping surface thereon, whereby pressure may be applied to said pin to compress said spring and force said clamping surfaces apart, whereby they may be placed over objects to be clamped.

6. A clamp comprising in combination a guide having parallel upper and lower members and an interconnecting side member forming a guide frame, said lower member carrying a plane clamping surface, a plunger passing through said lower member of said frame, a second plane clamping surface carried on one end of said plunger and positioned adjacent said first mentioned clamping surface carried by said frame, a spring contained within said guide frame surrounding said plunger and extending between said lower member and an abutment carried by said plunger within said frame said spring being adapted normally by applying force between said lower member and said abutment on said plunger to force said clamping surfaces together and an extension carried by said plunger and passing through the upper member of said frame to which pressure may be applied to compress said spring and force said clamping surfaces apart whereby they may be placed over objects to be clamped.

ROBERT H. BAUKIND.